(12) United States Patent
Abraham et al.

(10) Patent No.: US 9,300,511 B2
(45) Date of Patent: Mar. 29, 2016

(54) METHOD AND APPARATUS FOR IMPROVING THROUGHPUT OF 5 MHZ WLAN TRANSMISSIONS

(75) Inventors: Santosh Paul Abraham, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 13/343,433

(22) Filed: Jan. 4, 2012

(65) Prior Publication Data

US 2012/0170563 A1    Jul. 5, 2012

Related U.S. Application Data

(60) Provisional application No. 61/429,873, filed on Jan. 5, 2011.

(51) Int. Cl.
*H04L 29/02* (2006.01)
*H04W 84/12* (2009.01)
*H04L 27/26* (2006.01)
*H04W 24/06* (2009.01)

(52) U.S. Cl.
CPC ......... *H04L 27/2607* (2013.01); *H04L 27/2602* (2013.01); *H04W 24/06* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,193,506 B2 | 3/2007 | Logvinov et al. | |
| 7,599,332 B2 | 10/2009 | Van Zelst et al. | |
| 7,920,599 B1 * | 4/2011 | Subramanian et al. | 370/509 |
| 7,974,225 B2 * | 7/2011 | Kasher | 370/310 |
| 8,031,806 B2 * | 10/2011 | Trachewsky et al. | 375/299 |
| 8,498,245 B2 * | 7/2013 | Wu et al. | 370/328 |
| 8,548,007 B2 * | 10/2013 | Kwon et al. | 370/483 |
| 8,582,418 B2 * | 11/2013 | Lee et al. | 370/204 |
| 2006/0126545 A1 * | 6/2006 | Nanda | 370/310 |
| 2006/0193340 A1 | 8/2006 | Jones et al. | |
| 2006/0250943 A1 * | 11/2006 | Mujtaba et al. | 370/210 |
| 2007/0025392 A1 * | 2/2007 | Moorti et al. | 370/465 |
| 2007/0047666 A1 * | 3/2007 | Trachewsky | 375/267 |
| 2007/0189263 A1 | 8/2007 | Izumi et al. | |
| 2007/0263564 A1 * | 11/2007 | Hansen et al. | 370/328 |

(Continued)

FOREIGN PATENT DOCUMENTS

| | | |
|---|---|---|
| CN | 101478808 A | 7/2009 |
| JP | 2007221187 A | 8/2007 |

(Continued)

OTHER PUBLICATIONS

Lanante L., et al., "IEEE802.11ac Preamble with Legacy 802.11a/n Backward Compatibility", IEEE 802.11-09/0847r1, Nov. 18, 2009.

(Continued)

*Primary Examiner* — Candal Elpenord

(57) ABSTRACT

Certain aspects of the present disclosure relate to techniques for improving a transmission throughput of communications based on IEEE 802.11af physical (PHY) layer in television white space (TVWS) spectrum. In one aspect, a transmission preamble with a Legacy Signal (L-SIG) field is constructed, wherein the L-SIG field comprises a code indicating duration of a cyclic prefix (CP) of a packet following the preamble. The transmissions can be performed using 5 MHz bandwidth of the TVWS spectrum.

54 Claims, 8 Drawing Sheets

(56) References Cited

U.S. PATENT DOCUMENTS

| | | | |
|---|---|---|---|
| 2008/0109711 A1* | 5/2008 | Morioka et al. | 714/807 |
| 2009/0232079 A1 | 9/2009 | Khandekar et al. | |
| 2010/0202301 A1 | 8/2010 | Wen et al. | |
| 2010/0260159 A1 | 10/2010 | Zhang et al. | |
| 2010/0310002 A1 | 12/2010 | Lauer et al. | |
| 2010/0315953 A1 | 12/2010 | Pare, Jr. et al. | |
| 2010/0322295 A1* | 12/2010 | Tzannes et al. | 375/219 |
| 2011/0013575 A1* | 1/2011 | Liao et al. | 370/329 |
| 2011/0013721 A1 | 1/2011 | Liao et al. | |
| 2011/0032875 A1* | 2/2011 | Erceg et al. | 370/328 |
| 2011/0096863 A1 | 4/2011 | Lee et al. | |
| 2011/0110454 A1* | 5/2011 | Sampath et al. | 375/295 |
| 2011/0188482 A1 | 8/2011 | Vermani et al. | |
| 2015/0078368 A1 | 3/2015 | Vermani et al. | |

FOREIGN PATENT DOCUMENTS

| | | |
|---|---|---|
| JP | 2010206730 A | 9/2010 |
| JP | 2012523774 A | 10/2012 |
| TW | 200711381 | 3/2007 |
| WO | WO03077457 A1 | 9/2003 |
| WO | WO-2006086584 A2 | 8/2006 |
| WO | 2010120692 A1 | 10/2010 |

OTHER PUBLICATIONS

Syafei, W.A., et al., "A 1.2.Gbps wireless LAN system for 4K digital cinema transmission", The Institute of Electronics, Information and Communication Engineers (IEICE) Technical Report, Jun. 4, 2009, vol. 109, No. 78, pp. 85-90, SIS 2009-15.

Draft Standard for Information Technology Telecommunications and information exchange between systems. Local and metropolitan area networks Specific requirements Part 11: Wireless Lan Medium Access Control (MAC) and Physical Layer (PHY) specifications Amendment 5 Enhancements for Higher Throughput IEEE P802.11N/D9.0, Mar. 1, 2009, pp. 1,2,276-297, XP002606795. IEEE P802.11n/D9.0 Retrieved from the Internet: URL:http://ieeexplore.ieee.org/stamp/stamp.jsp?tp=&arnumber=4810960 [retrieved on Oct. 25, 2010] p. 278 p. 292 p. 29.

Zhang H et al., "802.11ac Preamble", IEEE 802.11-10/0070R0, [Online] Jan. 18, 2010, pp. 1-11, XP002610760, Retrieved from the Internet: URL:https://mentor.ieee.org/802.11/dcn/11-10-0359-00-00ac-802-11ac-preambie.ppt> [retrieved on Nov. 22, 2010].

International Search Report and Written Opinion—PCT/US2012/020345—ISA/EPO—May 23, 2012.

Partial International Search Report—PCT/US2012/020345—International Search Authority European Patent Office Mar. 28, 2012.

* cited by examiner

| Bandwidth (MHz) | Symbol Duration (µs) | CP Duration (µs) |
|---|---|---|
| 5 | 16 | 3.2 |
| 10 | 8 | 1.6 |
| 20 | 4 | 0.8 |

FIG. 4

METHOD AND APPARATUS FOR IMPROVING THROUGHPUT OF 5 MHZ WLAN TRANSMISSIONS

CLAIM OF PRIORITY UNDER 35 U.S.C. §119

The present Application for Patent claims benefit of U.S. Provisional Patent Application Ser. No. 61/429,873, entitled, "Improving Throughput of 5 MHz transmissions based on IEEE 802.11a WLAN standard", filed Jan. 5, 2011 and assigned to the assignee hereof and hereby expressly incorporated by reference herein.

BACKGROUND

1. Field

Certain aspects of the present disclosure generally relate to wireless communications and, more particularly, to a method and apparatus for improving throughput of 5 MHz transmissions based on Wireless Local Area Network (WLAN) family of standards.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements demanded for wireless communications systems, different schemes are being developed. One of the schemes, for example, entails expanding Wi-Fi technology to utilize the unused frequency spectrum in the television (TV) band (i.e., the TV white space). The Institute of Electrical and Electronics Engineers (IEEE) 802.11 of task group has been formed to define an amendment to the IEEE 802.11 standard for operating in the TV white space (TVWS). The IEEE 802.11 standard denotes a Wireless Local Area Network (WLAN) air interface standard developed by the IEEE 802.11 working group for short-range communications (e.g., tens of meters to a few hundred meters). By using the TVWS with frequencies below 1 GHz, IEEE 802.11af may offer greater propagation distances to be achieved, in addition to the increased bandwidth offered by the unused frequencies in the TV spectrum.

SUMMARY

Certain aspects of the present disclosure provide a method for wireless communications. The method generally includes constructing a preamble with a Legacy Signal (L-SIG) field, wherein the L-SIG field comprises a code indicating a duration of cyclic prefix (CP) of a packet following the preamble, and transmitting the preamble over a channel.

Certain aspects of the present disclosure provide an apparatus for wireless communications. The apparatus generally includes means for constructing a preamble with a Legacy Signal (L-SIG) field, wherein the L-SIG field comprises a code indicating a duration of cyclic prefix (CP) of a packet following the preamble, and means for transmitting the preamble over a channel.

Certain aspects of the present disclosure provide an apparatus for wireless communications. The apparatus generally includes a circuit configured to construct a preamble with a Legacy Signal (L-SIG) field, wherein the L-SIG field comprises a code indicating a duration of cyclic prefix (CP) of a packet following the preamble, and a transmitter configured to transmit the preamble over a channel.

Certain aspects of the present disclosure provide a computer-program product for wireless communications. The computer-program product includes a computer-readable medium comprising instructions executable to construct a preamble with a Legacy Signal (L-SIG) field, wherein the L-SIG field comprises a code indicating a duration of cyclic prefix (CP) of a packet following the preamble, and transmit the preamble over a channel.

Certain aspects of the present disclosure provide an access point. The access point generally includes at least one antenna, a circuit configured to construct a preamble with a Legacy Signal (L-SIG) field, wherein the L-SIG field comprises a code indicating a duration of cyclic prefix (CP) of a packet following the preamble, and a transmitter configured to transmit the preamble over a channel via the at least one antenna.

Certain aspects of the present disclosure provide a method for wireless communications. The method generally includes receiving a preamble with a Legacy Signal (L-SIG) field, wherein the L-SIG field comprises a code indicating a duration of cyclic prefix (CP) of a packet following the preamble, and decoding the L-SIG field.

Certain aspects of the present disclosure provide an apparatus for wireless communications. The apparatus generally includes means for receiving a preamble with a Legacy Signal (L-SIG) field, wherein the L-SIG field comprises a code indicating a duration of cyclic prefix (CP) of a packet following the preamble, and means for decoding the L-SIG field.

Certain aspects of the present disclosure provide an apparatus for wireless communications. The apparatus generally includes a receiver configured to receive a preamble with a Legacy Signal (L-SIG) field, wherein the L-SIG field comprises a code indicating a duration of cyclic prefix (CP) of a packet following the preamble, and a circuit configured to decode the L-SIG field.

Certain aspects of the present disclosure provide a computer-program product for wireless communications. The computer-program product includes a computer-readable medium comprising instructions executable to receive a preamble with a Legacy Signal (L-SIG) field, wherein the L-SIG field comprises a code indicating a duration of cyclic prefix (CP) of a packet following the preamble, and decode the L-SIG field.

Certain aspects of the present disclosure provide an access terminal. The access terminal generally includes at least one antenna, a receiver configured to receive, via the at least one antenna, a preamble with a Legacy Signal (L-SIG) field, wherein the L-SIG field comprises a code indicating a duration of cyclic prefix (CP) of a packet following the preamble, and a circuit configured to decode the L-SIG field.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 1 illustrates a wireless communications network in accordance with certain aspects of the present disclosure.

FIG. 4 illustrates example parameters of IEEE 802.11af physical (PHY) layer in accordance with certain aspects of the present disclosure.

DETAILED DESCRIPTION

Figure 1:
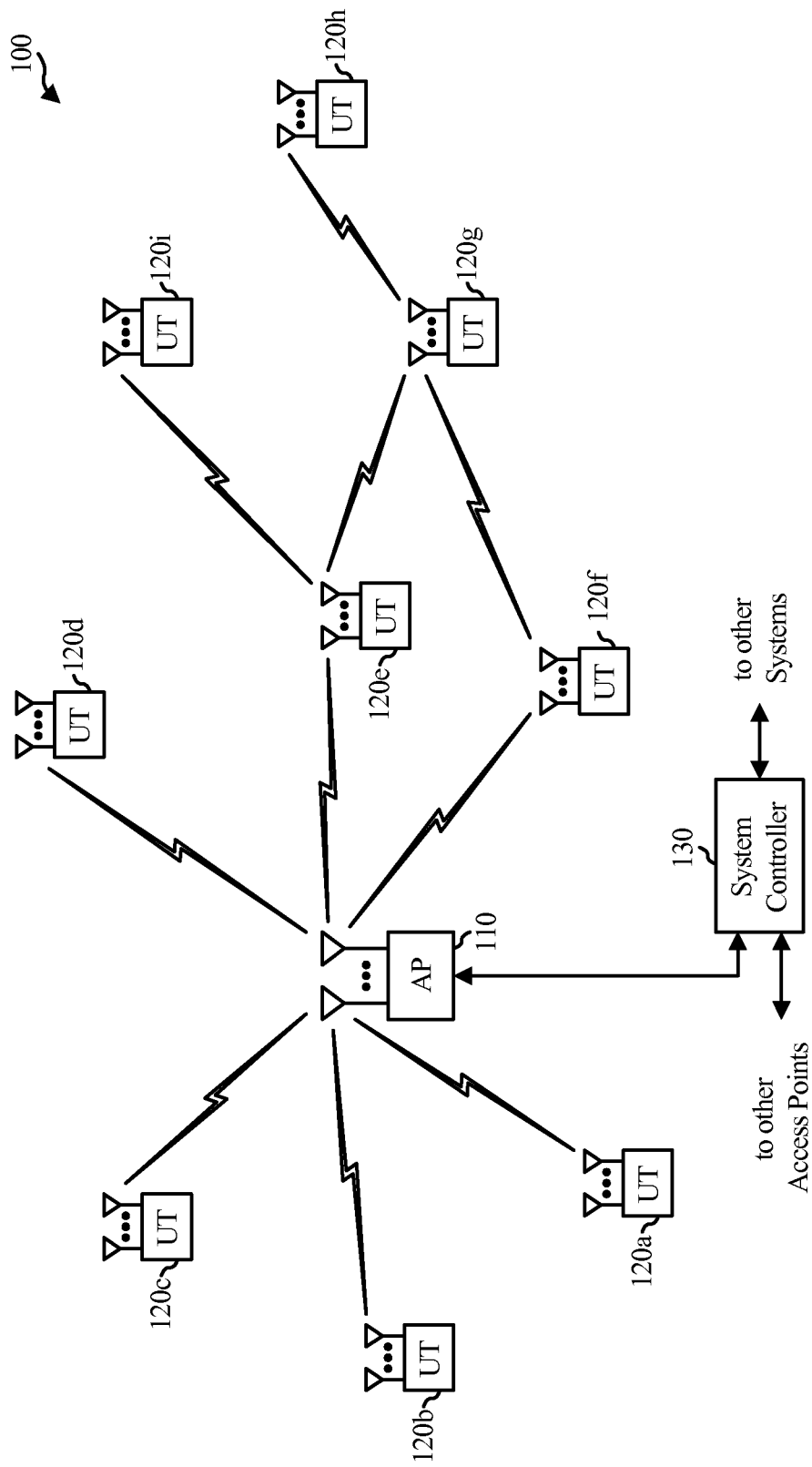

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are created in the frequency domain with OFDM and in the time domain with SC-FDMA.

The teachings herein may be incorporated into (e.g., implemented within or performed by) a variety of wired or wireless apparatuses (e.g., nodes). In some aspects, a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations, an access point may comprise a set top box kiosk, a media center, or any other suitable device that is configured to communicate via a wireless or wired medium. According to certain aspects of the present disclosure, the access point may operate in accordance with the Institute of Electrical and Electronics Engineers (IEEE) 802.11 family of wireless communications standards.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium. According to certain aspects of the present disclosure, the access terminal may operate in accordance with the IEEE 802.11 family of wireless communications standards.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
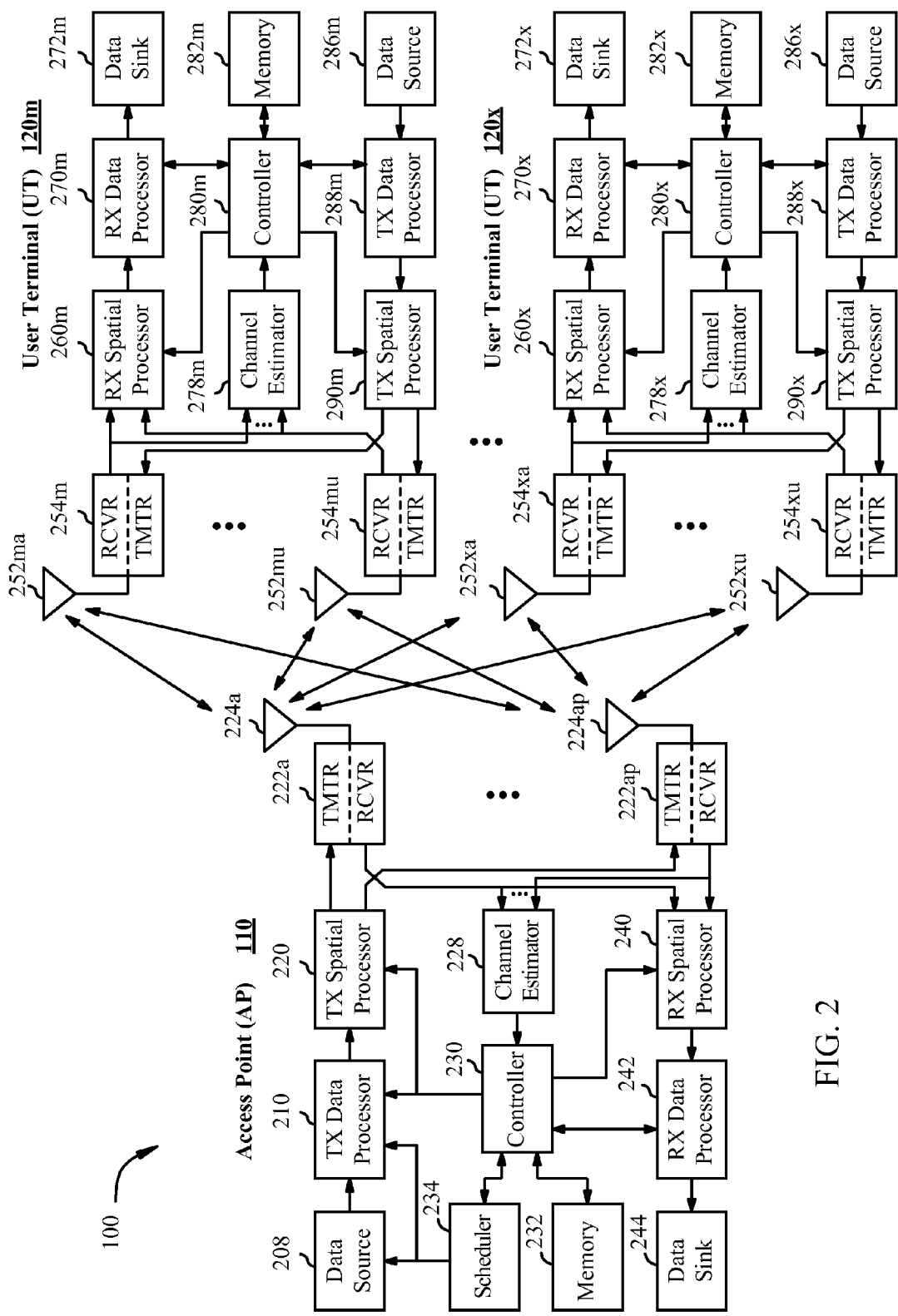
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
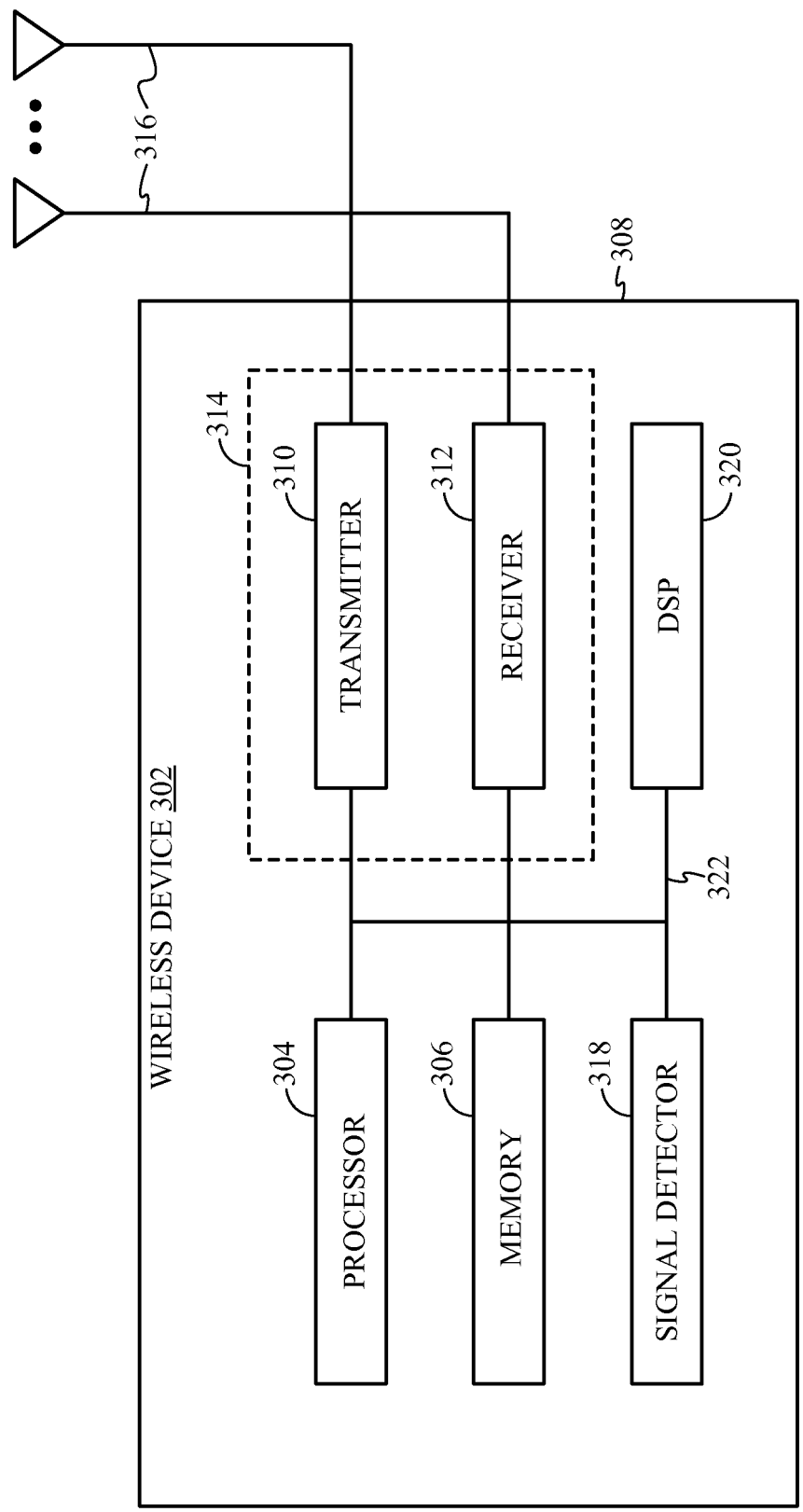
FIG. 3 illustrates a block diagram of an example wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and another wireless node (e.g., another wireless node in a remote location). The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may detect and quantify the level of signals received by the transceiver 314. The signal detector 318 may quantify detection of such signals using total energy, energy per subcarrier per symbol, power spectral density and/or other quantification metrics. The wireless device 302 may also include a digital signal processor (DSP) 320 for use in processing signals.

The various components of the wireless device 302 may be coupled by a bus system 322, which may include a power bus, a control signal bus, and a status signal bus in addition to a data bus.

According to certain aspects of the present disclosure, the access point 110 and the user terminals 120 illustrated in FIGS. 1-2 may communicate with each other utilizing the IEEE 802.11af television white space (TVWS) spectrum for achieving greater propagation distances and an increased bandwidth. The wireless device 302 from FIG. 3 may be also configured to communicate with other wireless device(s) (not shown in FIG. 3) in the TVWS.

Method for Improving 5 MHz Throughput in IEEE 802.11af Systems

A method described in the present disclosure may improve a transmission throughput of communications based on IEEE 802.11 of physical (PHY) layer for the TVWS, wherein the transmissions may be performed in 5 MHz channel bandwidth of the TVWS.

According to the current TVWS IEEE 802.11af standard, transmissions in 5 MHz, 10 MHz and 20 MHz channel bandwidths can all utilize 64 subcarriers. FIG. 4 illustrates symbol (packet) duration and cyclic prefix (CP) duration for these bandwidth sizes. According to back of envelope calculations, a range of 100 m for the 5 MHz transmission mode can be a good target. However, for the bandwidth of 5 MHz, the CP may be over-designed, if duration of the CP is equal to 3.2 μsec, which is the result of using 64 subcarriers and clocking down a 20 MHz transmission by a factor of four. Utilizing the CP duration of 1.6 μsec instead of 3.2 μsec can result in 12.5% reduction in CP overhead. If IEEE 802.11n PHY is used and clocked down by the factor of four, this can provide an option of using a 'Short Guard Interval' (signaled in a High Throughput Signal (HT-SIG) field of a transmission preamble). Hence, the IEEE 802.11n based PHY may reduce the duration of CP down to 1.6 μsec, if needed. However, for IEEE 802.11af based transmissions, there is no such option of a 'Short Guard Interval', i.e., the CP duration of 3.2 μsec may need to be used in a simple clocked-down design for 5 MHz transmission.

Certain aspects of the present disclosure allow for reduced CP transmissions based on IEEE 802.11af PHY. This can be useful for devices that do not support IEEE 802.11n, and for short packets even in devices that support IEEE 802.11n as it may save additional overhead of HT-SIG (two symbols), High Throughput Short Training Field (HT-STF) and High Throughput Long Training Field (HT-LTF). The main challenge however lies in the indication of reduced CP using an IEEE 802.11af transmission preamble. A solution to this problem is described in the present disclosure.

Indication of Short Guard Interval

In an aspect of the present disclosure, a single code may be transmitted on an unused Q-rail of a Legacy Signal (L-SIG) field of a preamble. This code may signal that a packet following the preamble may use a short guard interval (SGI), i.e., a cyclic prefix of reduced duration of 1.6 μsec. A transmit power of the Q-rail may be, for example, 6 dB lower than a transmit power on an I-rail of the L-SIG field in order to not affect the L-SIG. In other words, the code may be transmitted over all data tones at one-half amplitude of the L-SIG. This may increase a total L-SIG transmit power by only 0.9 dB. According to certain aspects, the single code transmitted on the unused Q-rail of the L-SIG field may signal anything, not only indication about the SGI.

The above method of indicating the SGI (i.e., CP duration of 1.6 μsec) may provide certain advantages. First, the data throughput may be improved by reducing the over-designed CP. Second, devices that do not implement this "enhanced 5 MHz" mode may still be able to decode the L-SIG and defer based on duration of data transmission indicated in the L-SIG.

In an aspect of the present disclosure, the code indicating the SGI may comprise an IEEE 802.11ac indication code, which may be a random code with a low Orthogonal Frequency Division Multiplexing (OFDM) peak-to-average power ratio (PAPR), i.e., the PAPR may be below a threshold level.

In an aspect of the present disclosure, a criterion for detecting an indication about the SGI may be given as:

$$\sum_{k=1}^{N} c(k) \text{Im}\{s(k)\} > r \cdot \sum_{k=1}^{N} |s(k)|, \quad (1)$$

where c(k) represents the IEEE 802.11af SGI indication code, s(k) represents channel-corrected L-SIG samples, N is a number of subcarriers, k is a subcarrier index, and r is a programmable threshold (e.g., the value of 0.15 can be used in baseline simulation).

Figure 5:
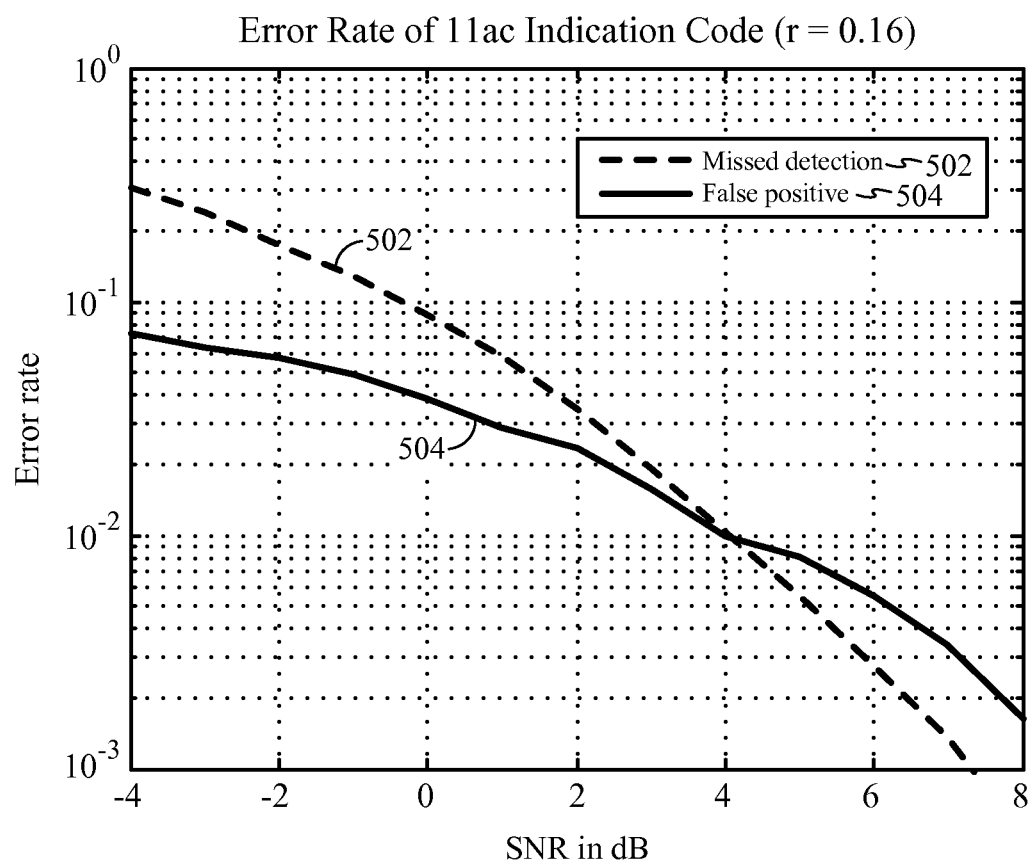
FIG. 5 illustrates error rate performance of a code transmitted within a Legacy Signal (L-SIG) field of a preamble indicating a short guard interval in accordance with certain aspects of the present disclosure.

Simulations are conducted in the present disclosure to estimate error rate performance of the proposed method for indicating SGI. As illustrated in FIG. 5, error rates for both missed detections and false positives according to the criterion defined by equation (1) are tracked.

For simulations, the following baseline scenario can be considered. A communication channel can be 20 MHz D-NLOS 1×1 channel (i.e., no line-of-site channel of type D) with 5000 instances. The L-SIG may be a random bit sequence over 48 subcarriers, the IEEE 802.11 of SGI indication may be achieved by using a random code with low OFDM PAPR (length 48), and a detection threshold factor r from equation (1) can be equal to 0.16. In addition, there can be 3 dB channel estimation gain from symbol repetition in a Legacy Long Training Field (L-LTF) of the IEEE 802.11af preamble.

Multiple scenarios are run in order to assess impact of several variables, such as code detection threshold and balance of error types (i.e., missed detections versus false positives). FIG. 5 illustrates error rate performance of missed detections (i.e., a plot 502) and false positives (i.e., a plot 504) in accordance with certain aspects of the present disclosure. It can be observed from FIG. 5 that the error rate of 1% can be achieved for both missed detections and false positives while transmitting the L-SIG at approximately 4 dB signal-to-noise ratio (SNR).

Issues with Deferral

In an aspect of the present disclosure, the L-SIG of the preamble may further indicate a packet size in bytes. Non-destination station (STA) devices may use this byte size information to compute a time required for deferral. On the other hand, a destination STA may need to know a number of bytes in order to locate a Frame Check Sequence (FCS) field of a frame following the preamble.

Figure 6:
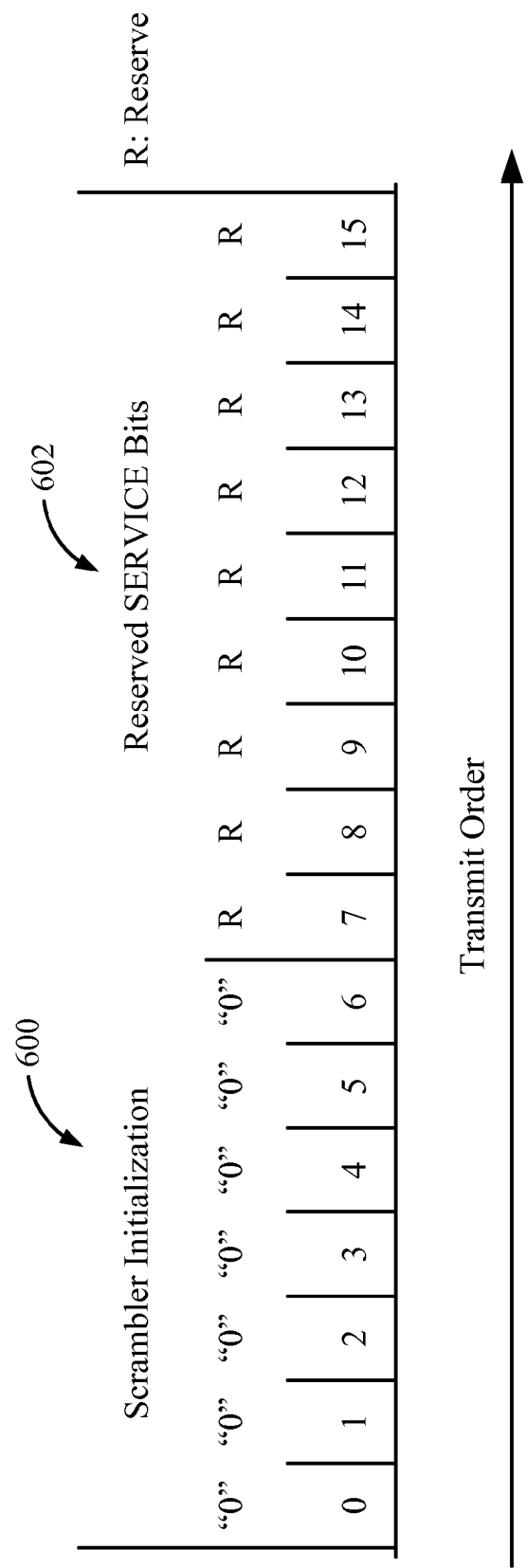
FIG. 6 illustrates an example assignment of a Service field of a transmission preamble in accordance with certain aspects of the present disclosure.

To preserve compatibility with "legacy" devices, the L-SIG byte size information may need to be "fudged" so that non-destination STA devices can defer for a correct amount of time. In general, this byte size indication may be smaller than an actual number of bytes in a Physical Protocol Data Unit (PPDU) of the frame following the preamble. According to certain aspects of the present disclosure, as illustrated in FIG. 6, a difference between the actual number of bytes and the L-SIG byte size may be stored in reserved bits 602 of a service field 600 of the preamble. In an aspect, the nine reserved bits 602 may be available to indicate a maximum difference of 511 bytes.

In an aspect of the present disclosure, the code indicating SGI may also signal a change in tone allocation to IEEE 802.11n 20 MHz transmission. In this case, the transmission of packet may switch from 48 to 52 data tones, further improving data throughput. The received L-LTF may be utilized to estimate a propagation channel at extra subcarriers (tones) −28, −27, 27, 28. These channel estimates may be stored and used if the IEEE 802.11 af indication code is detected on the L-SIG. In an aspect, pilot locations may be same in 802.11af and 802.11n for 64 subcarriers (e.g., tone locations +7, −7, +21, −21).

Figure 7:
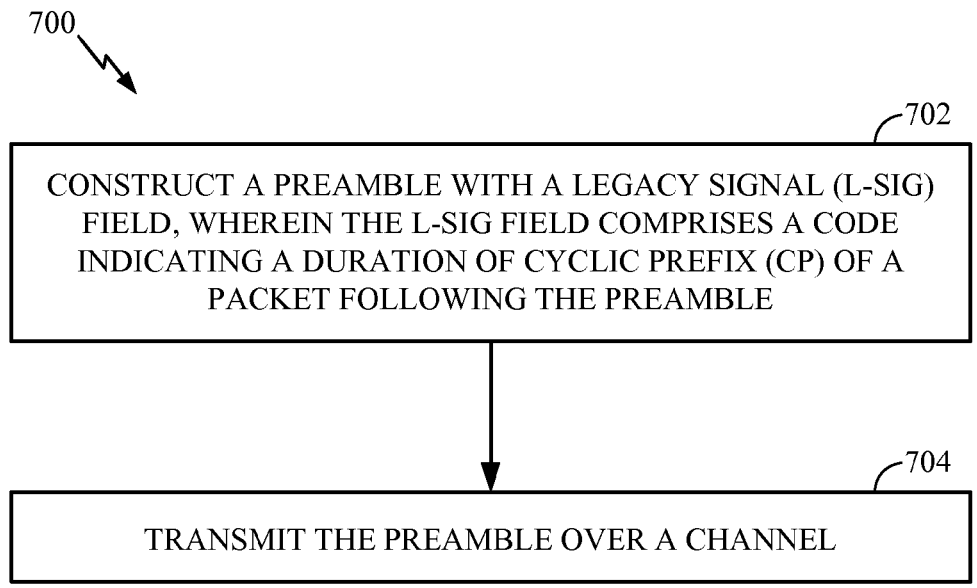
FIG. 7 illustrates example operations that may be performed at an access point in accordance with certain aspects of the present disclosure.

FIG. 7 illustrates example operations 700 that may be performed at an access point (e.g., the access point 110 from FIG. 2 and/or at the wireless device 302 from FIG. 3) in accordance with certain aspects of the present disclosure. At 702, the access point may construct a preamble with an L-SIG field, wherein the L-SIG field may comprise a code indicating duration of CP of a packet following the preamble. At 704, the access point may transmit the preamble over a channel.

Figure 8:
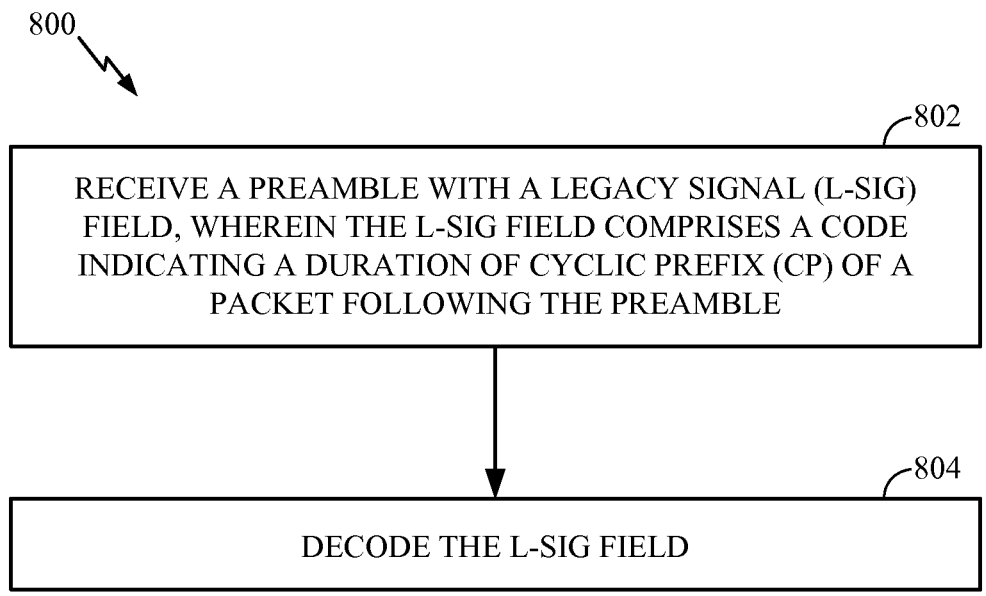
FIG. 8 illustrates example operations that may be performed at a user terminal in accordance with certain aspects of the present disclosure.

FIG. 8 illustrates example operations 800 that may be performed at a user terminal (e.g., at an access terminal 120 from FIG. 2 and/or at the wireless device 302 from FIG. 3) in accordance with certain aspects of the present disclosure. At 802, the access terminal may receive a preamble with an L-SIG field, wherein the L-SIG field may comprise a code indicating duration of CP of a packet following the preamble. At 804, the access terminal may decode the L-SIG field.

In summary, the method and apparatus are provided in the present disclosure for achieving an improved transmission throughput, wherein the transmissions may be based on the IEEE 802.11af PHY with 1.6 μsec CP duration (i.e., TVWS communication with SGI) using a communication bandwidth of 5 MHz. Furthermore, devices that do not implement this communication mode may still be able to defer properly. The simulation results show good error-rate performance for detecting the SGI.

Figure 7A:
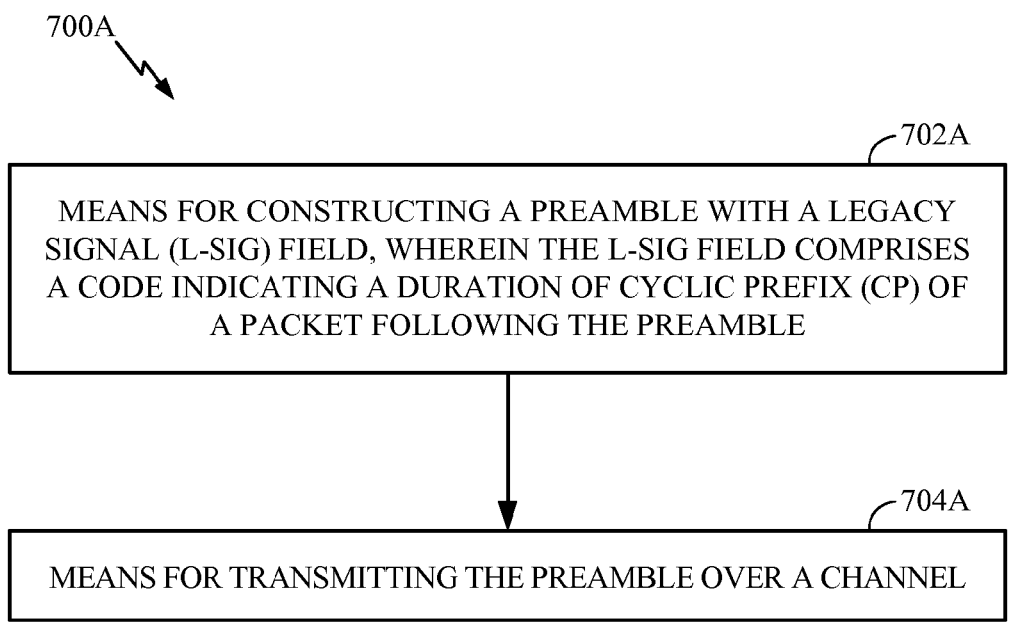
FIG. 7A illustrates example components capable of performing the operations of FIG. 7.
Figure 8A:
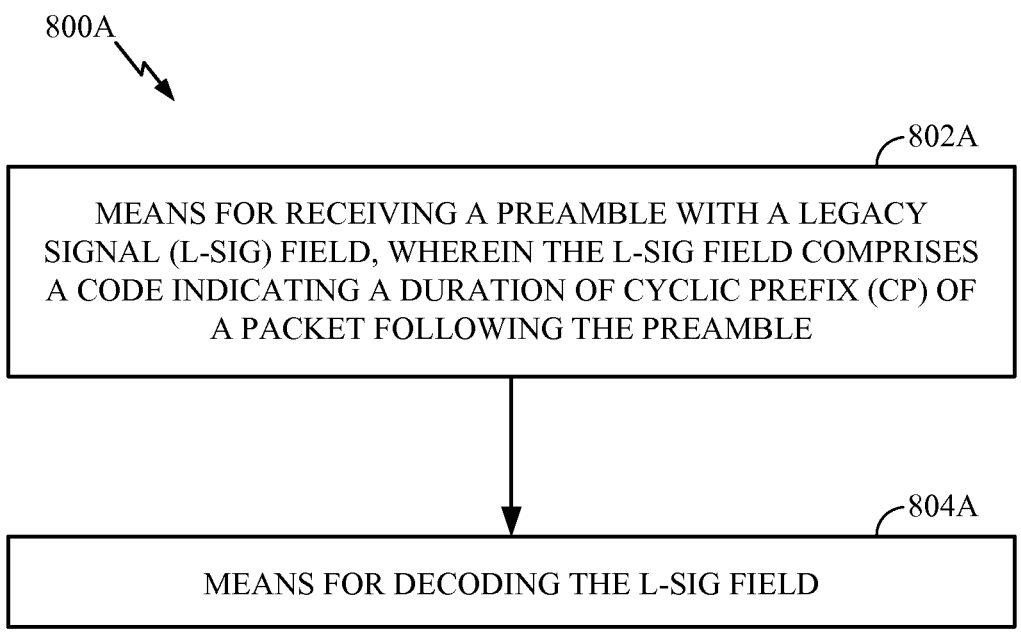
FIG. 8A illustrates example components capable of performing the operations of FIG. 8.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 700 and 800 illustrated in FIGS. 7 and 8 correspond to components 700A and 800A illustrated in FIGS. 7A and 8A.

For example, the means for constructing may comprise an application specific integrated circuit, e.g., the processor 210 from FIG. 2 of the access point 110, or the processor 304 from FIG. 3 of the wireless device 302. The means for transmitting may comprise a transmitter, e.g., the transmitter 222 from FIG. 2 of the access point 110, or the transmitter 310 from FIG. 3 of the wireless device 302. The means for receiving may comprise a receiver, e.g., the receiver 254 from FIG. 2 of the access terminal 120, or the receiver 312 from FIG. 3 of the wireless device 302. The means for decoding may comprise an application specific integrated circuit, e.g., the processor 270 from FIG. 2 of the access terminal 120, or the processor 304 from FIG. 3 of the wireless device 302. The means for determining may comprise an application specific integrated circuit, e.g., the processor 270 of the access terminal 120, or the processor 304 of the wireless device 302. The means for detecting may comprise an application specific integrated circuit, e.g., the processor 270 of the access terminal 120, or the processor 304 of the wireless device 302. The means for deferring may comprise an application specific integrated circuit, e.g., the processor 270 of the access terminal 120, or the processor 304 of the wireless device 302. The means for estimating may comprise an estimator, e.g., the channel estimator 278 from FIG. 2 of the access terminal 120, or the processor 304 of the wireless device 302. The means for storing may comprise an application specific integrated circuit, e.g., the memory 282 of the access terminal 120, or the memory 306 of the wireless device 302. The means for utilizing may comprise an application specific integrated circuit, e.g., the processor 270 of the access terminal 120, or the processor 304 of the wireless device 302.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for wireless communications, comprising:
    constructing a preamble with a Legacy Signal (L-SIG) field, wherein the L-SIG field comprises a code indicating a duration of cyclic prefix (CP) of a packet following the preamble, wherein the preamble comprises an indication of a size of the packet; and
    transmitting the preamble over a channel.

2. The method of claim 1, wherein:
    the duration of CP is approximately 1.6 μsec for a duration of the packet of approximately 16 μsec; and
    a bandwidth of the channel is approximately 5 MHz.

3. The method of claim 1, wherein the code is transmitted on a Q-rail of the L-SIG field.

4. The method of claim 3, wherein the code is transmitted on all data tones of the Q-rail at one-half amplitude of tones of an I-rail of the L-SIG field.

5. The method of claim 1, wherein the code comprises a random code with a peak-to-average power ratio (PAPR) below a threshold.

6. The method of claim 1, wherein the L-SIG field further comprises an indication about a byte size equal at most to a number of bytes in a Physical Protocol Data Unit (PPDU) following the preamble.

7. The method of claim 6, wherein a difference in bytes between the number of bytes in the PPDU and the byte size in the indication about the byte size is stored in a Service field of the preamble.

8. The method of claim 1, wherein:
    the code further indicates a change in tone allocation for transmitting the packet,
    the preamble is transmitted in accordance with IEEE 802.11n wireless communications standard, and
    a bandwidth of the channel is approximately 20 MHz.

9. The method of claim 8, wherein the change in tone allocation comprises utilizing 52 data tones for transmitting the packet after previously utilizing 48 data tones.

10. The method of claim 1, wherein the preamble is transmitted in accordance with IEEE 802.11 family of wireless communications standards.

11. An apparatus for wireless communications, comprising:
    means for constructing a preamble with a Legacy Signal (L-SIG) field, wherein the L-SIG field comprises a code indicating a duration of cyclic prefix (CP) of a packet following the preamble, wherein the preamble comprises an indication of a size of the packet; and
    means for transmitting the preamble over a channel.

12. The apparatus of claim 11, wherein:
    the duration of CP is approximately 1.6 μsec for a duration of the packet of approximately 16 μsec, and
    a bandwidth of the channel is approximately 5 MHz.

13. The apparatus of claim 11, wherein the code is transmitted on a Q-rail of the L-SIG field.

14. The apparatus of claim 11, wherein the code comprises a random code with a peak-to-average power ratio (PAPR) below a threshold.

15. The apparatus of claim 11, wherein the L-SIG field further comprises an indication about a byte size equal at most to a number of bytes in a Physical Protocol Data Unit (PPDU) following the preamble.

16. The apparatus of claim 15, wherein a difference in bytes between the number of bytes in the PPDU and the byte size in the indication about the byte size is stored in a Service field of the preamble.

17. The apparatus of claim 11, wherein:
    the code further indicates a change in tone allocation for transmitting the packet,
    the preamble is transmitted in accordance with IEEE 802.11n wireless communications standard, and
    a bandwidth of the channel is approximately 20 MHz.

18. The apparatus of claim 17, wherein the change in tone allocation comprises utilizing 52 data tones for transmitting the packet after previously utilizing 48 data tones.

19. The apparatus of claim 11, wherein the preamble is transmitted in accordance with IEEE 802.11 family of wireless communications standards.

20. The apparatus of claim 11, wherein the code is transmitted on all data tones of the Q-rail at one-half amplitude of tones of an I-rail of the L-SIG field.

21. An apparatus for wireless communications, comprising:
    a circuit configured to construct a preamble with a Legacy Signal (L-SIG) field, wherein the L-SIG field comprises a code indicating a duration of cyclic prefix (CP) of a packet following the preamble, wherein the preamble comprises an indication of a size of the packet; and
    a transmitter configured to transmit the preamble over a channel.

22. A non-transitory computer-readable medium comprising instructions executable to:
    construct a preamble with a Legacy Signal (L-SIG) field, wherein the L-SIG field comprises a code indicating a duration of cyclic prefix (CP) of a packet following the preamble, wherein the preamble comprises an indication of a size of the packet; and
    transmit the preamble over a channel.

23. An access point, comprising:
    at least one antenna;
    a circuit configured to construct a preamble with a Legacy Signal (L-SIG) field, wherein the L-SIG field comprises a code indicating a duration of cyclic prefix (CP) of a packet following the preamble, wherein the preamble comprises an indication of a size of the packet; and a transmitter configured to transmit the preamble over a channel via the at least one antenna.

24. A method for wireless communications, comprising:
receiving a preamble with a Legacy Signal (L-SIG) field, wherein the L-SIG field comprises a code indicating a duration of cyclic prefix (CP) of a packet following the preamble, wherein the preamble comprises an indication of a size of the packet; and
decoding the L-SIG field.

25. The method of claim 24, wherein decoding the L-SIG field further comprises:
determining the duration of CP.

26. The method of claim 24, wherein a Q-rail of the L-SIG field comprises the code.

27. The method of claim 24, wherein the code comprises a random code with a peak-to-average power ratio (PAPR) below a threshold.

28. The method of claim 24, wherein decoding the L-SIG field further comprises:
determining an indication about duration of a frame following the preamble, and the method further comprising
deferring based on the duration.

29. The method of claim 28, wherein the indication about duration of the frame comprises a byte size equal at most to a number of bytes in a Physical Protocol Data Unit (PPDU) of the frame.

30. The method of claim 29, further comprising:
determining, based on a Service field of the preamble, a difference in bytes between the number of bytes in PPDU and the byte size in the indication about duration of the frame.

31. The method of claim 24, further comprising:
determining, based on the code, a change in tone allocation utilized for transmission of the packet, wherein
the preamble was transmitted over a channel in accordance with IEEE 802.11n wireless communications standard, and
a bandwidth of the channel is approximately 20 MHz.

32. The method of claim 31, wherein the change in tone allocation comprises utilizing 52 data tones for the transmission of the packet after previously utilizing 48 data tones.

33. The method of claim 32, further comprising:
estimating the channel at extra tones −28, −27, 27, 28 of the packet based on a Legacy Long Training Field (L-LTF) of the preamble; and
storing values of the estimated channel at the extra tones.

34. The method of claim 33, further comprising:
upon detecting the code, utilizing the stored values of the estimated channel.

35. A method for wireless communications, comprising:
receiving a preamble with a Legacy Signal (L-SIG) field, wherein the L-SIG field comprises a code indicating a duration of cyclic prefix (CP) of a packet following the preamble;
decoding the L-SIG field; and
detecting that the duration of CP is of a first size, if $$\sum_{k=1}^{N} c(k)\text{Im}\{s(k)\} > r \cdot \sum_{k=1}^{N} |s(k)|,$$

where k is a subcarrier index, c (k) is a value of the code for that subcarrier index, s (k) is a tone of the L-SIG field for that subcarrier index, N is a number of subcarriers associated with the L-SIG field, and r is a threshold.

36. The method of claim 35, wherein:
the first size is equal to approximately 1.6 μsec for a duration of the packet of approximately 16 μsec,
the preamble was transmitted over a channel in accordance with IEEE 802.11 family of wireless communications standards, and
a bandwidth of the channel is approximately 5 MHz.

37. A method for wireless communications, comprising:
receiving a preamble with a Legacy Signal (L-SIG) field;
decoding the L-SIG field, wherein decoding the L-SIG field comprises determining a number of bytes in a frame following the preamble indicated in the L-SIG field; and
determining a location of a Frame Check Sequence (FCS) field within the frame based on the number of bytes.

38. An apparatus for wireless communications, comprising:
means for receiving a preamble with a Legacy Signal (L-SIG) field, wherein the L-SIG field comprises a code indicating a duration of cyclic prefix (CP) of a packet following the preamble, wherein the preamble comprises an indication of a size of the packet; and
means for decoding the L-SIG field.

39. The apparatus of claim 38, wherein the means for decoding the L-SIG field further comprises:
means for determining the duration of CP.

40. The apparatus of claim 38, wherein a Q-rail of the L-SIG field comprises the code.

41. The apparatus of claim 38, wherein the code comprises a random code with a peak-to-average power ratio (PAPR) below a threshold.

42. The apparatus of claim 38, wherein the means for decoding the L-SIG field comprises:
means for determining an indication about duration of a frame following the preamble, and the apparatus further comprising
means for deferring based on the duration.

43. The apparatus of claim 42, wherein the indication about the duration of the frame comprises a byte size equal at most to a number of bytes in a Physical Protocol Data Unit (PPDU) of the frame.

44. The apparatus of claim 43, further comprising:
means for determining, based on a Service field of the preamble, a difference in bytes between the number of bytes in the PPDU and the byte size in the indication about the duration of the frame.

45. The apparatus of claim 38, further comprising:
means for determining, based on the code, a change in tone allocation utilized for transmission of the packet, wherein
the preamble was transmitted over a channel in accordance with IEEE 802.11n wireless communications standard, and
a bandwidth of the channel is approximately 20 MHz.

46. The apparatus of claim 45, wherein the change in tone allocation comprises utilizing 52 data tones for the transmission of the packet after previously utilizing 48 data tones.

47. The apparatus of claim 46, further comprising:
means for estimating the channel at extra tones −28, −27, 27, 28 of the packet based on a Legacy Long Training Field (L-LTF) of the preamble; and
means for storing values of the estimated channel at the extra tones.

48. The apparatus of claim 47, further comprising:
means for utilizing the stored values of the estimated channel, upon detecting the code.

49. An apparatus for wireless communications, comprising:
means for receiving a preamble with a Legacy Signal (L-SIG) field, wherein the L-SIG field comprises a code indicating a duration of cyclic prefix (CP) of a packet following the preamble;
means for decoding the L-SIG field; and
means for detecting that the duration of CP is of a first size, if $$\sum_{k=1}^{N} c(k)\text{Im}\{s(k)\} > r \cdot \sum_{k=1}^{N} |s(k)|,$$

where k is a subcarrier index, c(k) is a value of the code for that subcarrier index, s(k) is a tone of the L-SIG field for that subcarrier index, N is a number of subcarriers associated with the L-SIG field, and r is a threshold.

50. The apparatus of claim 49, wherein:
the first size is equal to approximately 1.6 μsec for a duration of the packet of approximately 16 μsec,
the preamble was transmitted over a channel in accordance with IEEE 802.11 family of wireless communications standards, and
a bandwidth of the channel is approximately 5 MHz.

51. An apparatus for wireless communications, comprising:
means for receiving a preamble with a Legacy Signal (L-SIG) field;
means for decoding the L-SIG field, wherein the means for decoding the L-SIG field comprises means for determining a number of bytes in a frame following the preamble indicated in the L-SIG field; and
means for determining location of a Frame Check Sequence (FCS) field within the frame based on the number of bytes.

52. An apparatus for wireless communications, comprising:
a receiver configured to receive a preamble with a Legacy Signal (L-SIG) field, wherein the L-SIG field comprises a code indicating a duration of cyclic prefix (CP) of a packet following the preamble, wherein the preamble comprises an indication of a size of the packet; and
a circuit configured to decode the L-SIG field.

53. A non-transitory computer-readable medium comprising instructions executable to:
receive a preamble with a Legacy Signal (L-SIG) field, wherein the L-SIG field comprises a code indicating a duration of cyclic prefix (CP) of a packet following the preamble, wherein the preamble comprises an indication of a size of the packet; and
decode the L-SIG field.

54. An access terminal, comprising:
at least one antenna;
a receiver configured to receive, via the at least one antenna, a preamble with a Legacy Signal (L-SIG) field, wherein the L-SIG field comprises a code indicating a duration of cyclic prefix (CP) of a packet following the preamble, wherein the preamble comprises an indication of a size of the packet; and
a circuit configured to decode the L-SIG field.

* * * * *